(12) United States Patent
Kiyamura et al.

(10) Patent No.: US 11,924,405 B2
(45) Date of Patent: Mar. 5, 2024

(54) EVALUATION METHOD AND EVALUATION DEVICE OF IMAGE STABILIZATION EFFECT OF IMAGING DEVICE, AND PROGRAM STORAGE MEDIUM

(71) Applicant: CANON KABUSHIKI KAISHA, Tokyo (JP)

(72) Inventors: Kosuke Kiyamura, Kanagawa (JP); Toru Matsumoto, Kanagawa (JP); Tamaki Negishi, Tokyo (JP); Ryuichiro Yasuda, Tokyo (JP); Yu Narita, Kanagawa (JP); Go Naito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/965,875

(22) Filed: Oct. 14, 2022

(65) Prior Publication Data
US 2023/0118917 A1    Apr. 20, 2023

(30) Foreign Application Priority Data
Oct. 18, 2021 (JP) ................................. 2021-170033

(51) Int. Cl.
*H04N 23/68* (2023.01)
*G06T 7/00* (2017.01)
(Continued)

(52) U.S. Cl.
CPC ......... *H04N 17/002* (2013.01); *G06T 7/0002* (2013.01); *H04N 23/6811* (2023.01);
(Continued)

(58) Field of Classification Search
CPC .... H04N 23/6811; H04N 23/60; H04N 23/68; H04N 23/682; H04N 25/68;
(Continued)

(56) References Cited

U.S. PATENT DOCUMENTS 8,878,943 B2 * 11/2014 Kusaka .................. G03B 43/00
                                                           348/188
9,172,876 B2 * 10/2015 Kusaka .............. H04N 23/6811
(Continued)

FOREIGN PATENT DOCUMENTS

JP             5909686 B2      4/2016

*Primary Examiner* — Brian P Yenke
(74) *Attorney, Agent, or Firm* — Cowan, Liebowitz & Latman, P.C.

(57) ABSTRACT

An evaluation method of an image stabilization effect of an imaging device includes calculating an evaluation value of the image stabilization effect on the basis of shutter speed values in case of which each of a reference shake amount theoretically calculated on the basis of a shake waveform applied to the imaging device and a measured shake amount calculated using an image captured in a state in which the imaging device is vibrated becomes a specified shake amount, and setting the specified shake amount. The setting includes calculating an image deterioration amount of the imaging device caused by something other than a shake from the outside, and selecting a determination level that defines the specified shake amount from a plurality of determination levels having different shake amounts on the basis of the image deterioration amount.

11 Claims, 10 Drawing Sheets

(51) Int. Cl.
*H04N 17/00* (2006.01)
*H04N 23/60* (2023.01)

(52) U.S. Cl.
CPC ............... *G06T 2207/10144* (2013.01); *G06T 2207/30168* (2013.01)

(58) Field of Classification Search
CPC ......... G06T 7/0002; G06T 2207/10144; G06T 2207/30168; G06T 2207/20201; G06T 5/20; G06T 5/002; G06T 5/003; G02B 27/646; G03B 2205/0007
See application file for complete search history.

(56) References Cited

U.S. PATENT DOCUMENTS

| | | | | |
|---|---|---|---|---|
| 9,183,456 B2* | 11/2015 | Kusaka | ................ | G06V 10/44 |
| 9,204,046 B2* | 12/2015 | Ohara | ................ | G03B 43/00 |
| 9,723,208 B2* | 8/2017 | Miyasako | ........... | H04N 23/6812 |
| 9,973,699 B2* | 5/2018 | Watanabe | ............ | H04N 23/673 |
| 10,264,181 B2* | 4/2019 | Watanabe | ............ | H04N 23/685 |
| 2014/0247367 A1* | 9/2014 | Kusaka | ................ | H04N 23/68 |
| | | | | 348/188 |
| 2014/0247369 A1* | 9/2014 | Kusaka | ................ | H04N 17/002 |
| | | | | 348/208.1 |
| 2014/0247981 A1* | 9/2014 | Kusaka | ................ | G06V 10/44 |
| | | | | 382/165 |
| 2014/0331774 A1* | 11/2014 | Ohara | ................ | G03B 43/00 |
| | | | | 73/662 |
| 2015/0381893 A1* | 12/2015 | Miyasako | ........... | H04N 23/6811 |
| | | | | 348/208.6 |
| 2016/0316122 A1* | 10/2016 | Watanabe | ............ | H04N 23/685 |
| 2018/0131872 A1* | 5/2018 | Watanabe | ............ | H04N 23/685 |
| 2023/0224581 A1* | 7/2023 | Yasuda | ................ | G06T 5/002 |
| | | | | 348/208.99 |

* cited by examiner

EVALUATION METHOD AND EVALUATION DEVICE OF IMAGE STABILIZATION EFFECT OF IMAGING DEVICE, AND PROGRAM STORAGE MEDIUM

BACKGROUND OF THE INVENTION

Field of the Invention

The present invention relates to an evaluation method and an evaluation device of an image stabilization effect of an imaging device, and a program.

Description of the Related Art

As a method of evaluating an image stabilization effect of an imaging device, a method of calculating an evaluation value of an image stabilization effect in consideration of an influence of a blur offset amount is disclosed in Japanese Patent No. 5909686. Further, the blur offset amount is a blur amount of a captured image caused by something other than hand-shake, and an inherent numerical value of a device to be measured depending on optical performance of the imaging device, an effective pixel number, image processing, or the like.

In the method disclosed in Japanese Patent No. 5909686, if an error of the blur offset amount is large in comparison with a determination level of the image stabilization effect, accuracy of an evaluation value of the image stabilization effect may be decreased.

SUMMARY OF THE INVENTION

An evaluation method of an image stabilization effect of an imaging device according to an embodiment of the present invention includes calculating an evaluation value of the image stabilization effect on the basis of shutter speed values in case of which each of a reference shake amount theoretically calculated on the basis of a shake waveform applied to the imaging device and a measured shake amount calculated using an image captured in a state in which the imaging device is vibrated becomes a specified shake amount, and setting the specified shake amount. The setting includes calculating an image deterioration amount of the imaging device caused by something other than a shake from the outside, and selecting a determination level that defines the specified shake amount from a plurality of determination levels having different shake amounts on the basis of the image deterioration amount.

Further features of the present invention will become apparent from the following description of exemplary embodiments with reference to the attached drawings.

DESCRIPTION OF THE EMBODIMENTS

Hereinafter, types for implementing the present invention will be described with reference to the accompanying drawings. However, the following embodiments are not limited to the invention related to the claims and all characteristics described in the following embodiments are not necessarily limited to the present invention.

First Embodiment

Figure 1:
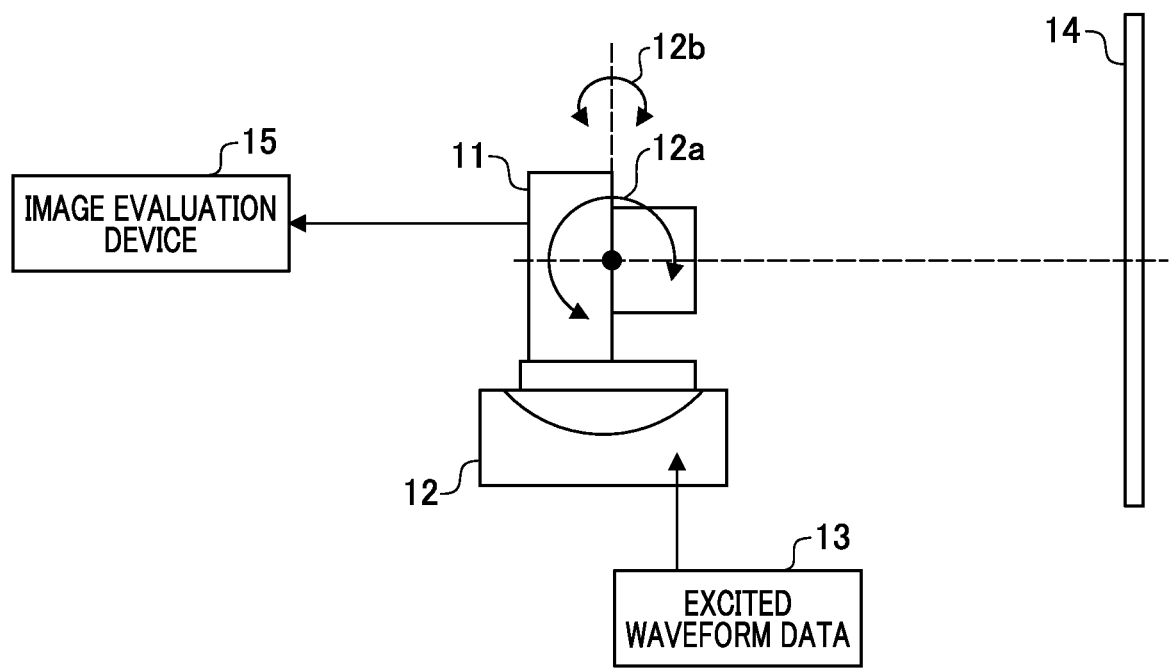
FIG. 1 is a schematic diagram showing a configuration example of an evaluation system of a first embodiment.

FIG. 1 is a schematic diagram showing a configuration example of an evaluation system of a first embodiment. An evaluation system 10 is a system configured to measure an image stabilization effect of an imaging device 11. The imaging device 11 that is a device to be measured is fixed to a vibrator base 12. The vibrator base 12 mechanically generates vibrations that imitate a human hand-shake on the basis of input excited waveform data 13, and excites the imaging device 11. The vibrator base 12 performs excitation in a pitch direction shown by an arrow 12a (around an axis in a vertical direction of the drawing of FIG. 1), and excitation in a yaw direction shown by an arrow 12b (around an axis in an upward/downward direction of FIG. 1). In addition, the vibrator base 12 can control switch-over between an excitation state and a standstill state.

The imaging device 11 fixed to the vibrator base 12 images a chart 14 disposed to face the imaging device 11 as a subject. As an example, the chart 14 includes a plurality of white and black belt-like portions having a certain width in horizontal and vertical directions and color natural image portions.

An image of the chart imaged by the imaging device 11 during excitation is input to an image evaluation device 15. The image evaluation device 15 is, for example, a computer configured to execute image analysis software. The image evaluation device 15 detects contrast of the image of the chart imaged by the imaging device 11, and measures deterioration of the excited image.

Figure 2:
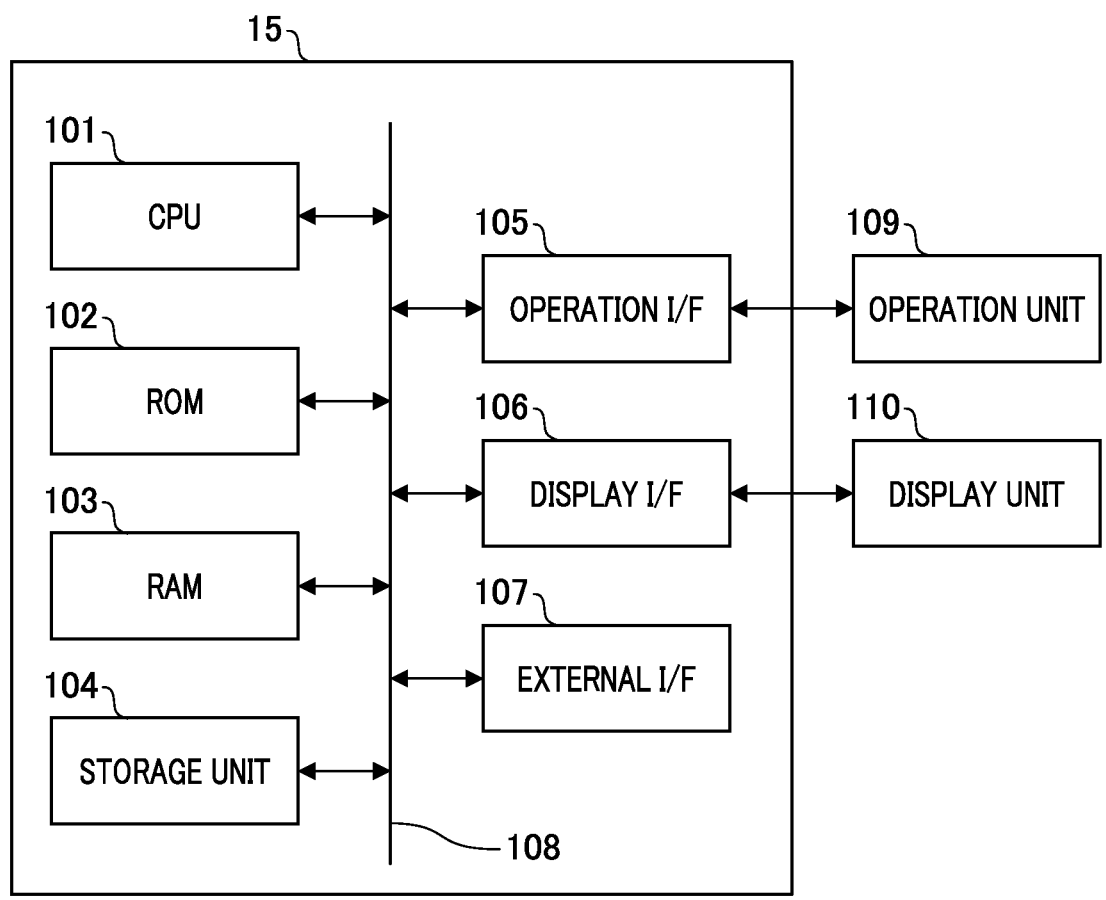
FIG. 2 is a view showing a hardware configuration example of an image evaluation device.

FIG. 2 is a view showing a hardware configuration example of the image evaluation device 15.

The image evaluation device 15 has an CPU 101, a ROM 102, a RAM 103, a storage unit 104, an operation I/F 105, a display I/F 106, and an external I/F 107. Elements of the image evaluation device 15 are connected to each other via a system bus 108. Further, CPU is an abbreviation for central processing unit, the ROM is abbreviation of a read only memory, and the RAM is abbreviation of a random access memory.

The CPU 101 starts an operating system (OS) using a boot program stored in the ROM 102. The CPU 101 executes the following various types of processing by executing a program of image analysis software stored in the storage unit 104 using the OS. The RAM 103 is used as a temporary region such as a main memory, a work area, or the like, of the CPU 101.

The operation I/F 105 is an interface configured to connect the CPU 101 to an operation unit 109, and sends information input from the operation unit 109 to the CPU 101. The operation unit 109 is a device configured to receive an input of an operator to the image evaluation device 15, which is constituted by, for example, a keyboard, a pointing device, or the like.

The display I/F 106 is an interface configured to connect the CPU 101 to a display unit 110, which outputs image data to be displayed to the display unit 110. The display unit 110 is a device configured to output information on an operation screen of the image evaluation device 15, which is constituted by a display device such as a liquid crystal display or the like.

The external I/F 107 is an interface configured to acquire image data or various types of information of the imaging device 11 that is the device to be measured. The external I/F 107 may have a configuration of acquiring information through wired or wireless communication, and may have a configuration of reading information via a detachable storage medium.

Next, an evaluation method of an image stabilization effect of the imaging device in the first embodiment will be described with reference to FIG. 3.

In S200, the chart 14 is imaged by the imaging device 11 of the device to be measured while the vibrator base 12 is in a standstill state. Accordingly, an image for evaluation in the standstill state of the imaging device 11 is acquired. In the imaging in the standstill state, the setting is changed such that a shutter speed value of the imaging device 11 is slowed downward by a maximum of one step from a predetermined value to a value sufficient for calculation of the evaluation value. Then, a plurality of times of imaging is performed for each of the shutter speed values.

In S300, the image evaluation device 15 selects and sets a determination level of the image stabilization effect from a plurality of determination levels. Detailed description of S300 will be described below.

In S400, the chart 14 is imaged by the imaging device 11 of the device to be measured while the vibrator base 12 is in an excitation state. Here, a shake correcting function of the imaging device 11 is set to ON. Accordingly, an image for evaluation in a vibration state of the imaging device 11 is obtained. In the imaging in the vibration state, like the imaging in the standstill state, the setting is changed such that the shutter speed value of the imaging device 11 is slowed down by a maximum of one step from the predetermined value to a value sufficient for calculation of the evaluation value. Then, a plurality of times of imaging is performed for each of the shutter speed values.

In S500, the image evaluation device 15 calculates an evaluation value showing the image stabilization effect of the imaging device 11 on the basis of the setting value of the imaging device 11, the image for evaluation in the standstill state, and the image for evaluation in the vibration state. Detailed description of S500 will be described below.

Figure 3:
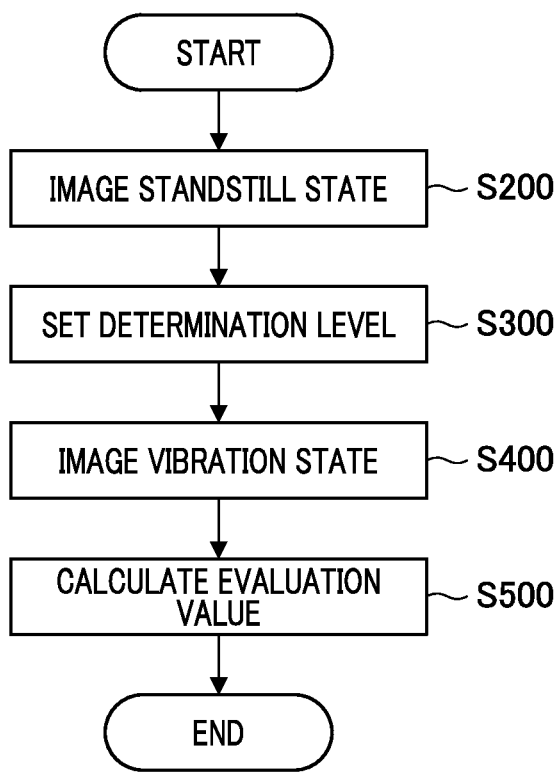
FIG. 3 is a flowchart showing an evaluation method of an image stabilization effect of an imaging device in the first embodiment.

Hereinafter, a series of operations of the evaluation method shown in FIG. 3 are terminated.

Figure 4:
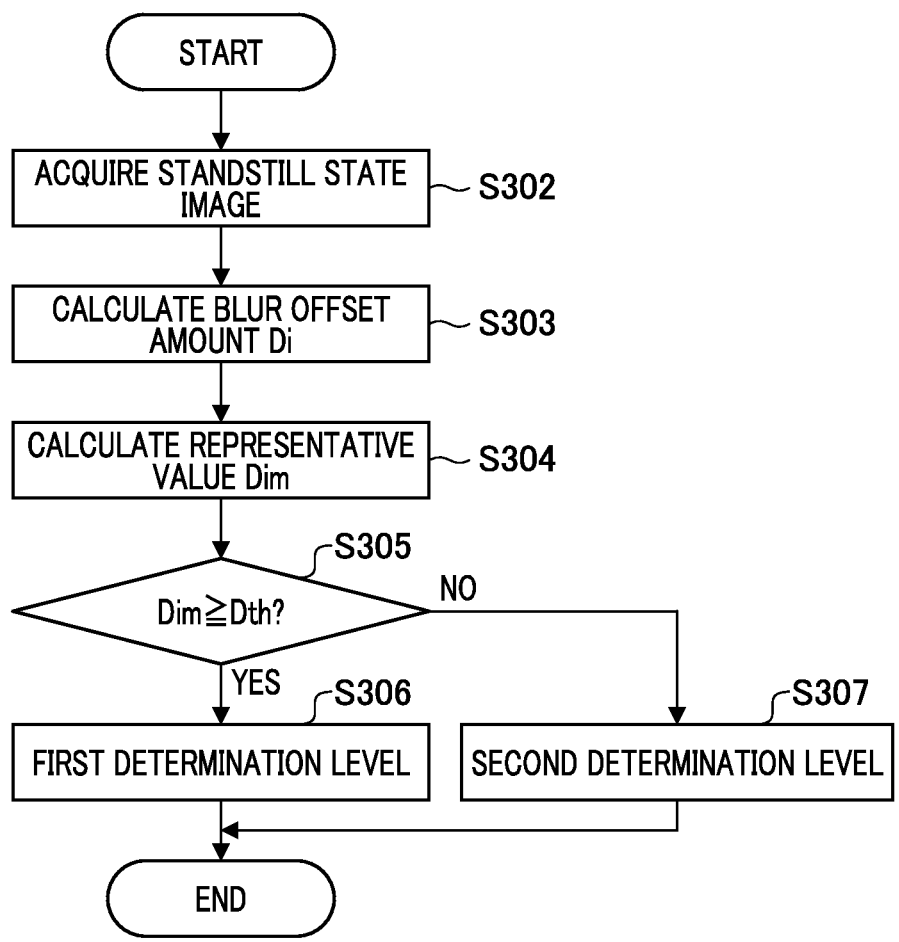
FIG. 4 is a flowchart showing determination level setting of FIG. 3 in detail.

FIG. 4 is a flowchart showing determination level setting (S300) of FIG. 3 in detail.

Here, a program configured to realize an operation of the determination level setting of S300 (FIG. 4, or the following FIG. 9 and FIG. 10) is stored in any one of the RAM 103, the storage unit 104 and the ROM 102, and executed by the CPU 101.

In S302, the image evaluation device 15 acquires the image for evaluation in the standstill state of the imaging device 11. As described above, the image for evaluation is an image group obtained by changing the shutter speed value a plurality of times and imaging the chart 14 with the same shutter speed value a plurality of times.

In S303, the image evaluation device 15 calculates a blur offset amount Di from the image for evaluation in the standstill state. For example, the image evaluation device 15 calculates a square root of a sum of squares of blur amounts in a boundary between different color regions in each of the images for evaluation (for example, a boundary between white and black belt-like portions). Then, the image evaluation device 15 calculates the blur offset amount Di for each shutter speed value by averaging a sum total of the calculation values with the same shutter speed value by the number of times of imaging.

The blur offset amount Di is a blur amount generated in the image in the standstill state, which is a parameter showing an image deterioration amount caused by something other than the shake from the outside. For example, since image deterioration occurs due to optical performance or the like of an imaging element, a lens, or the like, of the imaging device 11, the blur offset amount Di is an inherent value for each of the imaging devices 11. Further, in the embodiment, the blur offset amount Di obtained for each shutter speed value shows a relation between the shutter speed value, which is an exposure time, and the image deterioration amount.

In S304, the image evaluation device 15 calculates a representative value Dim from the blur offset amount Di that is a function of the shutter speed value. For example, the image evaluation device 15 calculates the blur offset amount Di corresponding to the shutter speed value where the shutter speed value is fastest, i.e., the exposure time is shortest, as the representative value Dim.

Here, the representative value Dim may be a value calculated on the basis of an absolute value of the blur offset amount Di. For example, the image evaluation device 15 may calculate the representative value Dim by statistics processing of obtaining an average value, a center value, or the like, of the blur offset amount using the entire or a part of the range of the shutter speed value as a target. Alternatively, the image evaluation device 15 may calculate the representative value Dim by extracting the blur offset amount corresponding to the specified shutter speed value.

In S305, the image evaluation device 15 determines whether the representative value Dim of the blur offset amount is a threshold Dth or more (Dim≥Dth). The threshold Dth corresponds to a second determination level where the shake amount is set to be smaller than a default determination level (also referred to as a first determination level) among a plurality of determination levels of the image stabilization effect. The threshold Dth in S305 may be the same as the shake amount of the second determination level, or may be a value obtained by multiplying the shake amount of the second determination level by a predetermined coefficient.

Further, the determination level is used to define the specified shake amount when a reference shutter speed value and a measured shutter speed value, which will be described below, are calculated in evaluation value calculation of S500.

If the representative value Dim in S305 is the threshold Dth or more, the processing shifts to S306. In S306, the image evaluation device 15 sets the determination level (specified shake amount) of the image stabilization effect to the first determination level, and then, terminates the processing of FIG. 4.

Meanwhile, in S305, if the representative value Dim is less than the threshold Dth, the processing shifts to S307. In S307, the image evaluation device 15 sets the determination level (specified shake amount) of the image stabilization effect to the second determination level smaller than the first determination level, and then, terminates the processing of FIG. 4.

Figure 5:
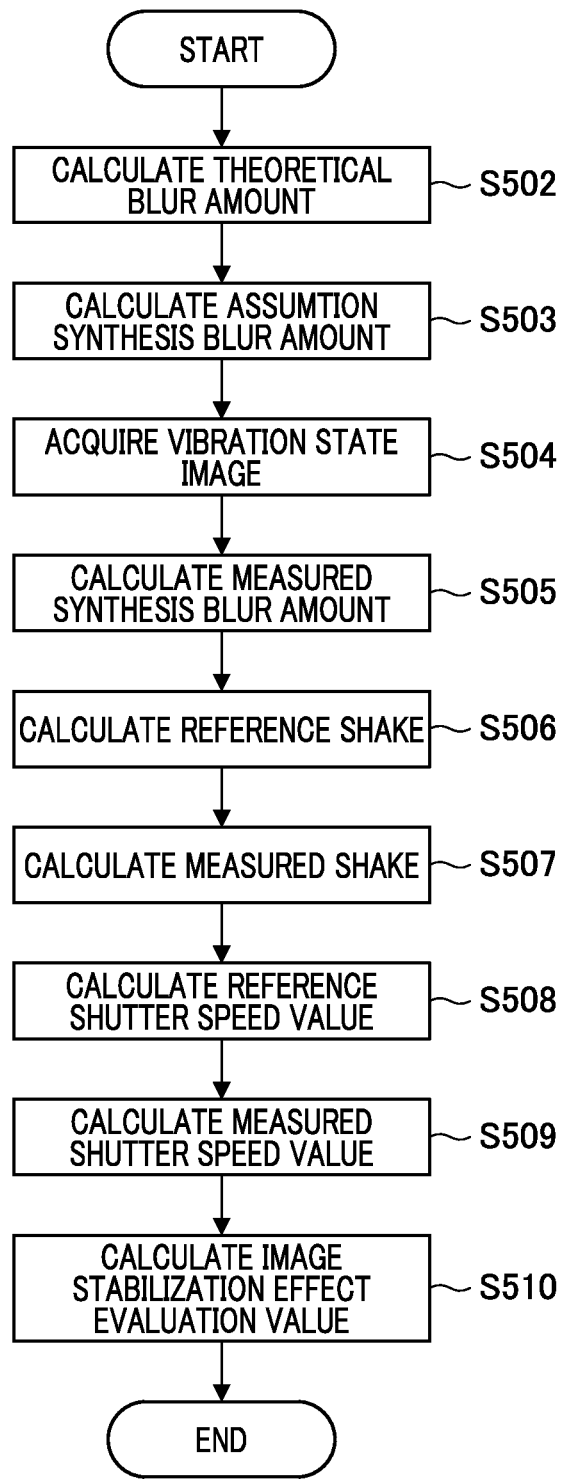
FIG. 5 is a flowchart showing evaluation value calculation of FIG. 3 in detail.

FIG. 5 is a flowchart showing evaluation value calculation (S500) of FIG. 3 in detail.

Here, a program configured to realize an operation of the determination level setting of S500 (FIG. 5, or the following FIG. 7) is stored in any one of the RAM 103, the storage unit 104 and the ROM 102, and executed by the CPU 101.

In S502, the image evaluation device 15 calculates a theoretical shake amount based on the excited waveform data 13. The theoretical shake amount is a theoretical value corresponding to the shake amount that can be measured from the image captured in the state in which the shake correcting function is OFF when the imaging device 11 is excited with the shake waveform of the excited waveform data 13.

In S503, the image evaluation device 15 calculates an assumption synthesis blur amount for each of the plurality of shutter speed values. The assumption synthesis blur amount is calculated by a square root of the sum of squares of the theoretical shake amount and the blur offset amount. That is, the image evaluation device 15 calculates the assumption synthesis blur amount using the blur offset amount Di for each shutter speed value calculated in the determination level setting of S300 and the theoretical shake amount of the S502.

In S504, the image evaluation device 15 acquires the image for evaluation in the vibration state of the imaging device 11 (the image obtained by imaging the chart 14 in the excitation state in S400).

In S505, the image evaluation device 15 calculates the measured synthesis blur amount from the image for evaluation in the vibration state. For example, the image evaluation device 15 calculates the square root of the sum of squares of the blur amount in the boundary between the different color regions in each image for evaluation (for example, a boundary between white and black belt-like portions). Then, the image evaluation device 15 calculates the measured synthesis blur amount for each shutter speed value by averaging the sum total of the calculation values with the same shutter speed value by the number of times of imaging.

In S506, the image evaluation device 15 calculates a theoretical reference shake amount for each shutter speed value by subtracting a corresponding blur offset amount from the assumption synthesis blur amount for each shutter speed value.

In S507, the image evaluation device 15 calculates a measured shake amount for each shutter speed value by subtracting a corresponding blur offset amount from the measured synthesis blur amount for each shutter speed value.

In S508, the image evaluation device 15 calculates a shutter speed value when the reference shake amount is a determination level set in the determination level setting (S300) as the reference shutter speed value using the plurality of reference shake amounts calculated for each shutter speed value.

The reference shake amount is obtained discretely for each shutter speed. For this reason, for example, the image evaluation device 15 may calculate a reference shutter speed value from an intersection of an interpolation straight line of the reference shake amount and the determination level by linearly interpolating the reference shake amounts of the two shutter speed values that sandwich the determination level of the image stabilization effect.

In S509, the image evaluation device 15 calculates a shutter speed value when the measured shake amount is the determination level set in the determination level setting (S300) as the measured shutter speed value using the plurality of measured shake amounts calculated in each shutter speed value. Further, since the calculation method of the measured shutter speed value is the same as the calculation method of the reference shutter speed value except that the measured shake amount is used instead of the reference shake amount, overlapping description thereof will be omitted.

In S510, the image evaluation device 15 calculates an evaluation value showing an image stabilization effect using the reference shutter speed value (S508) and the measured shutter speed value (S509). Specifically, the image evaluation device 15 obtains an evaluation value from a difference between the reference shutter speed value and the measured shutter speed value (a stage number of the image stabilization effect). After that, the processing of FIG. 5 is terminated.

Hereinafter, the effects of the first embodiment will be described with reference to FIGS. 6A to 6C.

First, the blur offset amount is ideally constant regardless of the shutter speed value. However, the actual blur offset amount is changed by the shutter speed value due to the measurement error, a variation for each imaging, an influence of the exposure time, or the like. In general, it is conceivable that the variation amount of the blur offset amount is also increased as the absolute value of the blur offset amount is increased.

Figure 6A:
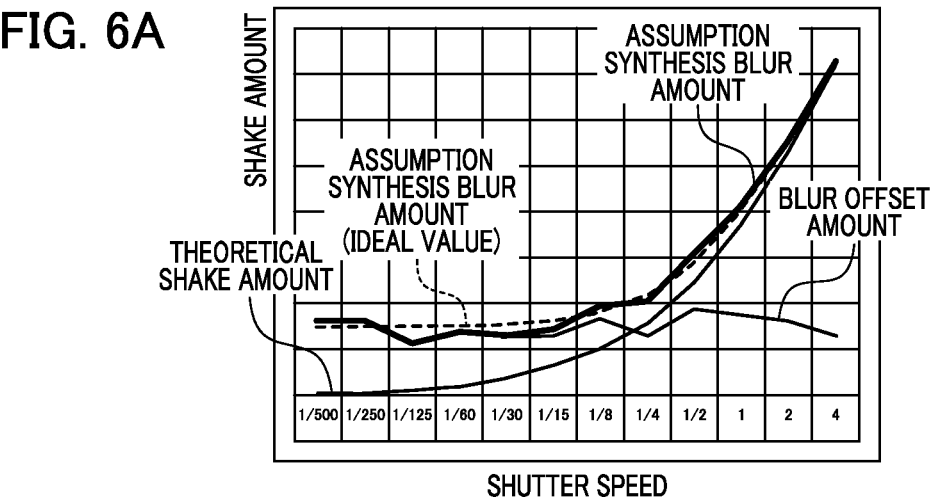
FIG. 6A is a graph showing an example of an assumption synthesis blur amount.

FIG. 6A is a graph showing an example of the assumption synthesis blur amount. If the variation amount of the blur offset amount is large, the error of the assumption synthesis blur amount calculated using the blur offset amount is also increased. A dotted line in FIG. 6A shows the assumption synthesis blur amount (ideal value) if the blur offset amount is constant regardless of the shutter speed value. It can be seen that the actual assumption synthesis blur amount does not result in a smooth curve because an error occurs due to fluctuation of the blur offset amount with respect to the ideal value.

In addition, as described above, the assumption synthesis blur amount is calculated by the square root of the sum of squares of the theoretical shake amount and the blur offset amount. Since the theoretical shake amount is increased as the shutter speed value is increased, the error of the assumption synthesis blur amount is increased when the shutter speed value is relatively small.

Figure 6B:
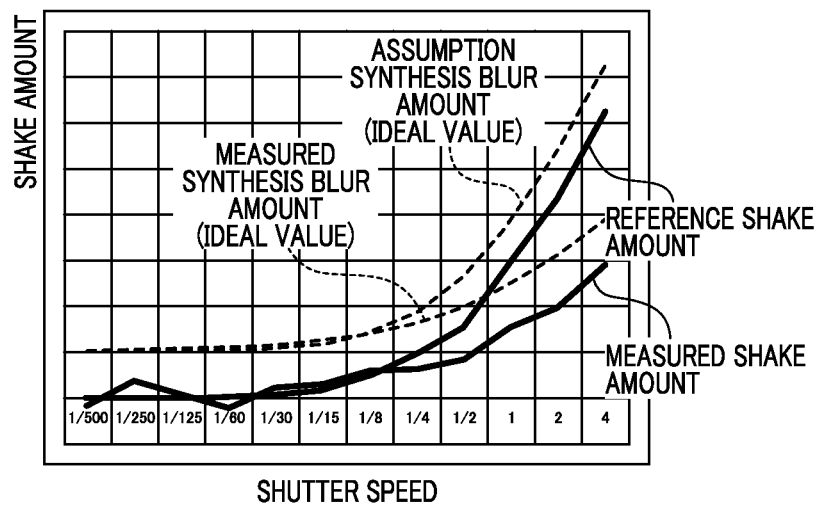
FIG. 6B is a graph showing an example of a reference shake amount and a measured shake amount.

FIG. 6B is a graph showing an example of the reference shake amount and the measured shake amount. If the variation amount of the blur offset amount is large, the error of the reference shake amount and the measured shake amount calculated using the blur offset amount is increased. A dotted line of FIG. 6B indicates an assumption synthesis blur amount (ideal value) and a measured synthesis blur amount (ideal value) if the blur offset amount is constant regardless of the shutter speed value. It can be seen that the actual reference shake amount and measured shake amount do not have a smooth curve because an error occurs due to the fluctuation of the blur offset amount with respect to the ideal value.

In addition, as described above, the reference shake amount and the measured shake amount are calculated by subtracting the blur offset amount from the assumption synthesis blur amount and the measured synthesis blur amount. Since the assumption synthesis blur amount and the measured synthesis blur amount are increased as the shutter speed value is increased, when the shutter speed value is relatively small, the errors of the assumption synthesis blur amount and the measured synthesis blur amount are increased.

Figure 6C:
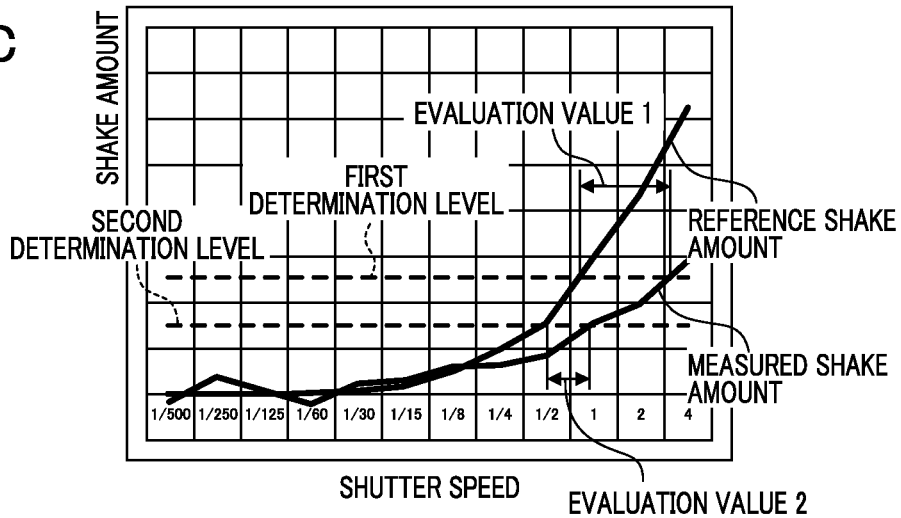
FIG. 6C is a graph showing an example of an evaluation value.

FIG. 6C is a graph showing an example of the evaluation value. In FIG. 6C, an evaluation value 1 is an evaluation value calculated by the first determination level, and an evaluation value 2 is an evaluation value calculated by the second determination level having a shake amount smaller than that of the first determination level.

It can be seen that the evaluation value 2 is calculated in a region where the shutter speed value with respect to the evaluation value 1 is small because the reference shake amount and the measured shake amount are increased as the shutter speed value is increased as described above. In addition, it can be seen that the difference between the reference shake amount and the measured shake amount is smaller on the side of the evaluation value 2 than the evaluation value 1 because the above-mentioned difference is increased as the shutter speed value is increased. As a result, the evaluation value 2, i.e., in the case where the determination level is small, is more susceptible to the fluctuation of the blur offset amount than the evaluation value 1.

In the first embodiment, the determination level of the image stabilization effect is selected on the basis of the blur offset amount that is the image deterioration amount (S300). For example, if the blur offset amount is the threshold Dth or more, the determination level of the image stabilization effect is set to the first determination level (S305, S306). Then, the evaluation value is calculated using the first determination level in calculation of the evaluation value of the image stabilization effect (S500). Meanwhile, when the blur offset amount is less than the threshold Dth, the determination level of the image stabilization effect is set to the second determination level smaller than the first determination level (S305, S307). Then, the evaluation value is calculated using the second determination level in calculation of the evaluation value of the image stabilization effect (S500).

That is, the evaluation value is calculated using the first determination level with a large shake amount if the blur offset amount is relatively large. Accordingly, it is possible to suppress accuracy of the evaluation value from being decreased due to the error by the blur amount caused by something other than the hand-shake. In addition, if the blur offset amount is relatively small as being less than the shake amount of the second determination level, the evaluation value can be calculated using the second determination level smaller than the first determination level. Accordingly, it is possible to accurately measure the image stabilization effect of the imaging device 11 if the error of the blur amount caused by something other than the hand-shake is small.

Second Embodiment

Next, a second embodiment will be described. Further, in the description of the following embodiments, the common elements as in the first embodiment are designated by the same reference signs and overlapping description thereof will be omitted.

In the second embodiment, the configuration of the evaluation system 10 is the same as in the first embodiment. In the second embodiment, as the evaluation value calculation (S500) of the evaluation method shown in FIG. 3, processing of FIG. 7 is performed instead of that of FIG. 5.

Figure 7:
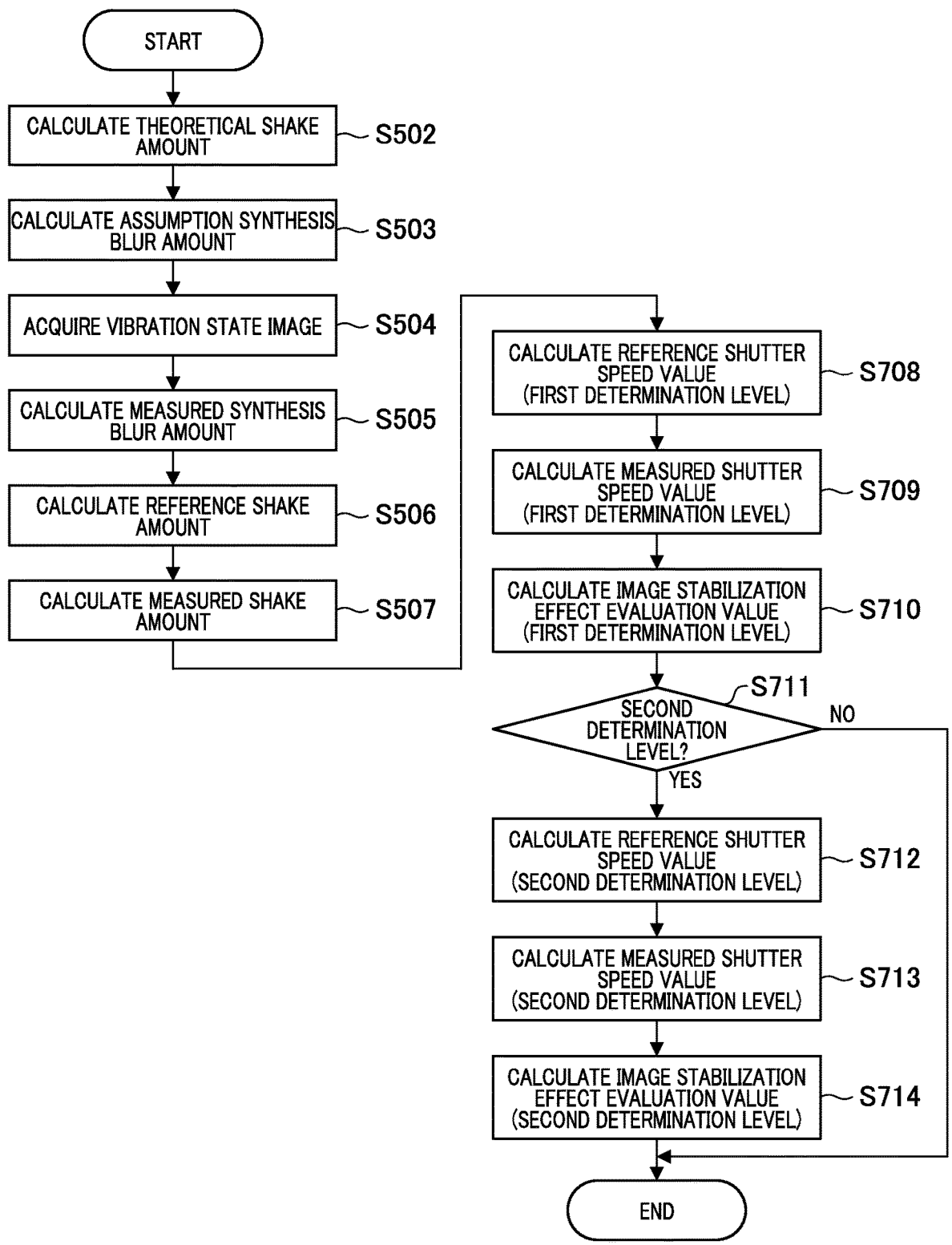
FIG. 7 is a flowchart showing evaluation value calculation in a second embodiment in detail.

FIG. 7 is a flowchart showing evaluation value calculation in the second embodiment in detail. In FIG. 7, the processing from S502 to S507 is the same as in FIG. 5. In FIG. 7, S708 is performed after S507.

In S708, the image evaluation device 15 calculates the shutter speed value when the reference shake amount is the specified shake amount as the reference shutter speed value using the plurality of reference shake amounts calculated for each shutter speed value. The specified shake amount in S708 is the first determination level regardless of the processing of the determination level setting of S300.

In S709, the image evaluation device 15 calculates the shutter speed value when the measured shake amount is the specified shake amount as the measured shutter speed value using the plurality of measured shake amounts calculated for each shutter speed value. The specified shake amount in S709 is the first determination level regardless of the processing in the determination level setting of S300.

In S710, the image evaluation device 15 calculates a first evaluation value showing the image stabilization effect using the reference shutter speed value (S708) and the measured shutter speed value (S709).

In S711, the image evaluation device 15 determines whether the determination level of the image stabilization effect is set to the second determination level. If it is not set to the second determination level, the image evaluation device 15 terminates the processing of FIG. 7. Meanwhile, the processing shifts to S712 if it is set to the second determination level.

In S712, the image evaluation device 15 calculates the shutter speed value when the reference shake amount is the specified shake amount as the reference shutter speed value using the plurality of reference shake amounts calculated for each shutter speed value. The specified shake amount in S712 is a value set in the determination level setting of S300, i.e., the second determination level.

In S713, the image evaluation device 15 calculates a shutter speed value when the measured shake amount is the specified shake amount as the measured shutter speed value using the plurality of measured shake amounts calculated for each shutter speed value. The specified shake amount in S713 is a value set by the determination level setting of S300, i.e., the second determination level.

In S714, the image evaluation device 15 calculates a second evaluation value showing the image stabilization effect using the reference shutter speed value (S712) and the measured shutter speed value (S713). After that, the processing of FIG. 7 is terminated.

In the second embodiment, the first evaluation value is calculated using the first determination level (S710). Further, if the second determination level is selected on the basis of the blur offset amount that is the image deterioration amount, the second evaluation value is calculated using the second determination level (S714).

Accordingly, like the first embodiment, the evaluation value can be calculated using the second determination level smaller than the first determination level if the blur offset amount is relatively small. Accordingly, it is possible to accurately measure the image stabilization effect of the imaging device 11 if the error of the blur amount caused by something other than the hand-shake is small. In addition, in the second embodiment, regardless of the magnitude of the blur offset amount, the first evaluation value is calculated using the first determination level. For this reason, since at least the measurement result by the first determination level is guaranteed in the second embodiment, compatibility with the evaluation of the image stabilization effect for the other the imaging device 11 is maintained.

Third Embodiment

Next, a third embodiment will be described. First, a variation amount of the blur offset amount will be described with reference to FIG. 8.

Figure 8:
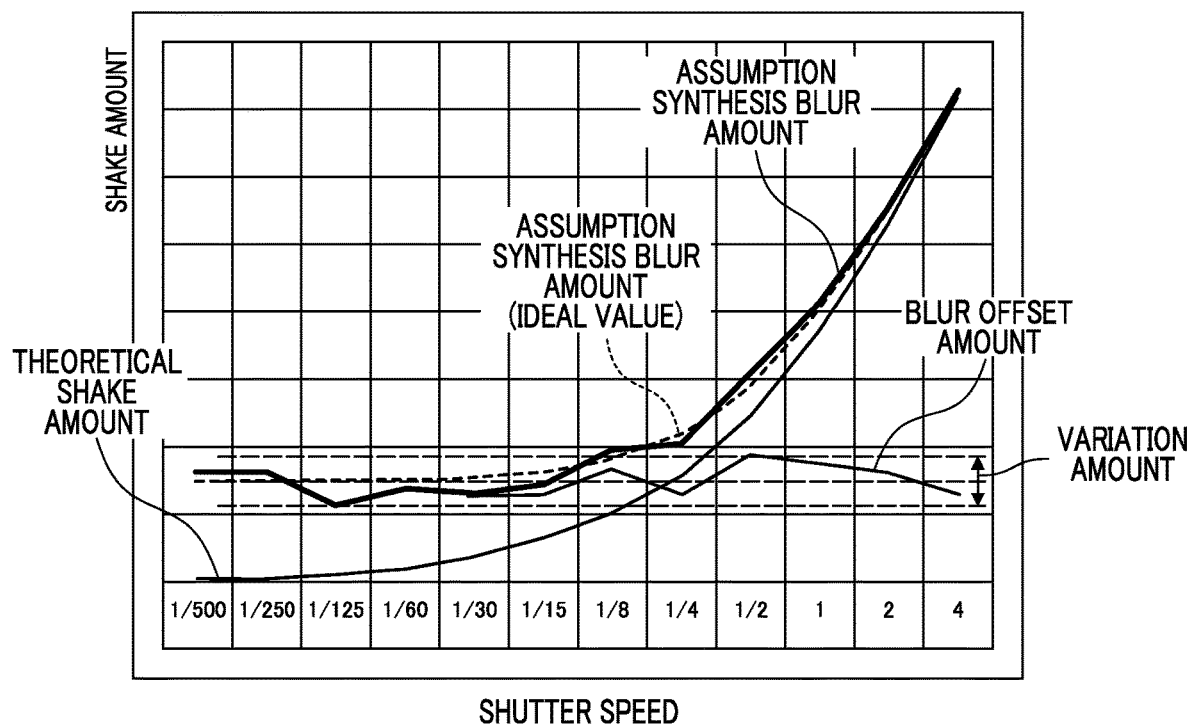
FIG. 8 is a graph showing an example of a blur offset amount.

FIG. 8 is a graph showing an example of the blur offset amount. A dashed line of FIG. 8 indicates an average value of the blur offset amounts within a predetermined shutter speed range, and a two-dot chain line of FIG. 8 indicates a variation amount De from the average values of the blur offset amounts within a predetermined shutter speed range.

Here, the variation amount De may be a value calculated on the basis of distribution of the blur offset amount Di within a range of the shutter speed value. For example, the image evaluation device 15 may calculate the variation amount De by statistics processing of obtaining a standard deviation, dispersion, or the like, of the blur offset amounts using the entire or a part of the range of the shutter speed values as a target. Further, the variation amount De of the blur offset amount indicates a relation with the variation amount of the image deterioration amount for the variation in shutter speed value that is the exposure time.

In the third embodiment, the configuration of the evaluation system 10 is the same as in the first embodiment. In the third embodiment, as the determination level setting (S300) shown in FIG. 3, processing of FIG. 9 is performed instead of FIG. 4.

Figure 9:
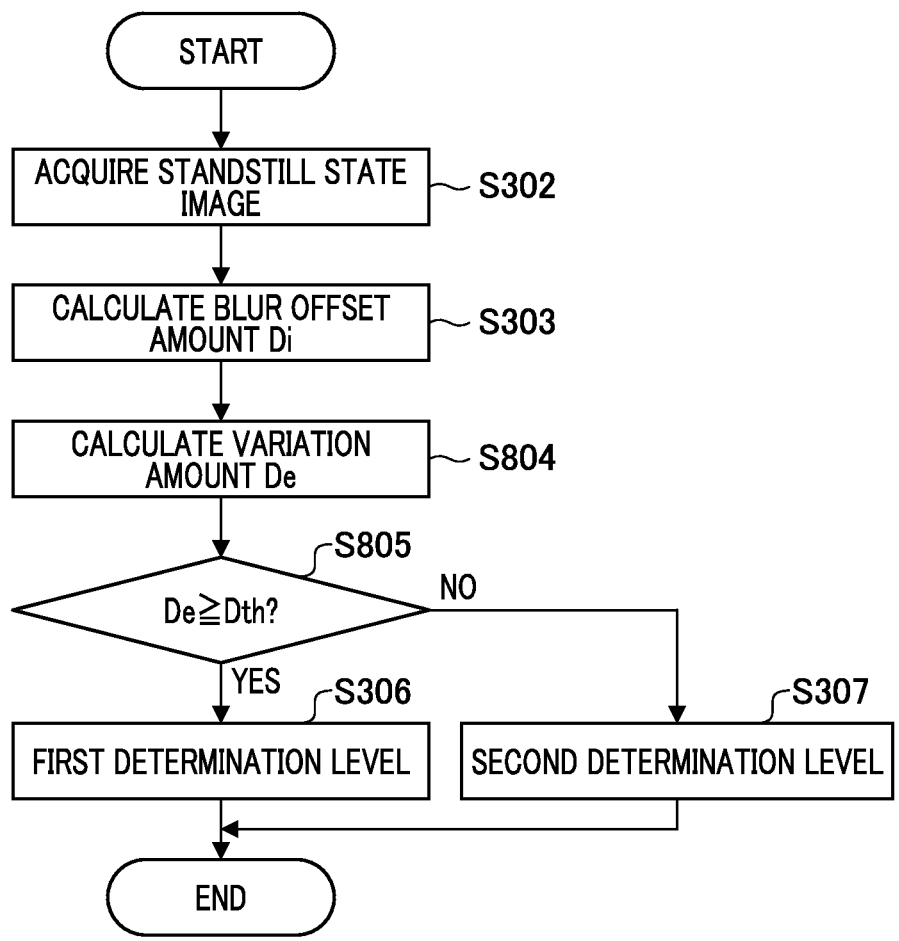
FIG. 9 is a flowchart showing determination level setting in a third embodiment in detail.

FIG. 9 is a flowchart showing the determination level setting in the third embodiment. In FIG. 9, processing from S302 to S303 is the same as in FIG. 4. In FIG. 9, S804 is performed after S303.

In S804, the image evaluation device 15 calculates the variation amount De of the blur offset amount on the basis of the distribution of the blur offset amounts Di within the range of the shutter speed value.

In S805, the image evaluation device 15 determines whether the variation amount De of the blur offset amount is the threshold Dth or more (De≥Dth). The threshold Dth corresponds to the second determination level where the shake amount is set to be smaller than the first determination level along the plurality of determination levels of the image stabilization effect. The threshold Dth in S805 may be the same value as the threshold Dth (S305) of the first embodiment or may be different values. In addition, the threshold Dth in S805 may be a value on the basis of the absolute value of the second determination level, or for example, may be a value obtained by multiplying the shake amount of the second determination level by a predetermined coefficient.

The processing shifts to S306 if the variation amount De is the threshold Dth or more in S805. In S306, the image evaluation device 15 sets the determination level (specified shake amount) of the image stabilization effect to the first determination level, and then, terminates the processing of FIG. 9.

Meanwhile, the processing shifts to S307 if the variation amount De is less than the threshold Dth in S805. In S307, the image evaluation device 15 sets the determination level (specified shake amount) of the image stabilization effect to the second determination level smaller than the first determination level, and then, terminates the processing of FIG. 9.

In the third embodiment, the determination level of the image stabilization effect is selected by comparing the variation amount of the blur offset amount that is the image deterioration amount with the threshold Dth (S300). For example, if the variation amount De of the blur offset amount is the threshold Dth or more, the determination level of the image stabilization effect is set to the first determination level (S805, S306). In this case, the evaluation value is calculated using the first determination level in the calculation of the evaluation value of the image stabilization effect (S500). Meanwhile, if the variation amount De of the blur offset amount is less than the threshold Dth, the determination level of the image stabilization effect is set to the second determination level smaller than the first determination level (S805, S307). In this case, the evaluation value is calculated using the second determination level in the calculation of the evaluation value of the image stabilization effect (S500).

That is, in the third embodiment, if the variation amount of the blur offset amount is the threshold or more and the error of the blur amount caused by something other than the hand-shake is relatively large, the evaluation value is calculated using the first determination level having a large shake amount. Accordingly, it is possible to suppress a decrease in accuracy of the evaluation value due to the error of the blur amount caused by something other than the hand-shake. In addition, if the variation amount of the blur offset amount is less than the threshold and the error of the blur amount caused by something other than the hand-shake is relatively small, the evaluation value can be calculated using the second determination level smaller than the first determination level. Accordingly, it is possible to more accurately measure the image stabilization effect of the imaging device 11 if the error of the blur amount caused by something other than the hand-shake is small.

Fourth Embodiment

Next, a fourth embodiment will be described. In the fourth embodiment, the configuration of the evaluation system 10 is the same as the first embodiment. In the fourth embodiment, as the determination level setting (S300) shown in FIG. 3, processing of FIG. 10 is performed instead of FIG. 4.

Figure 10:
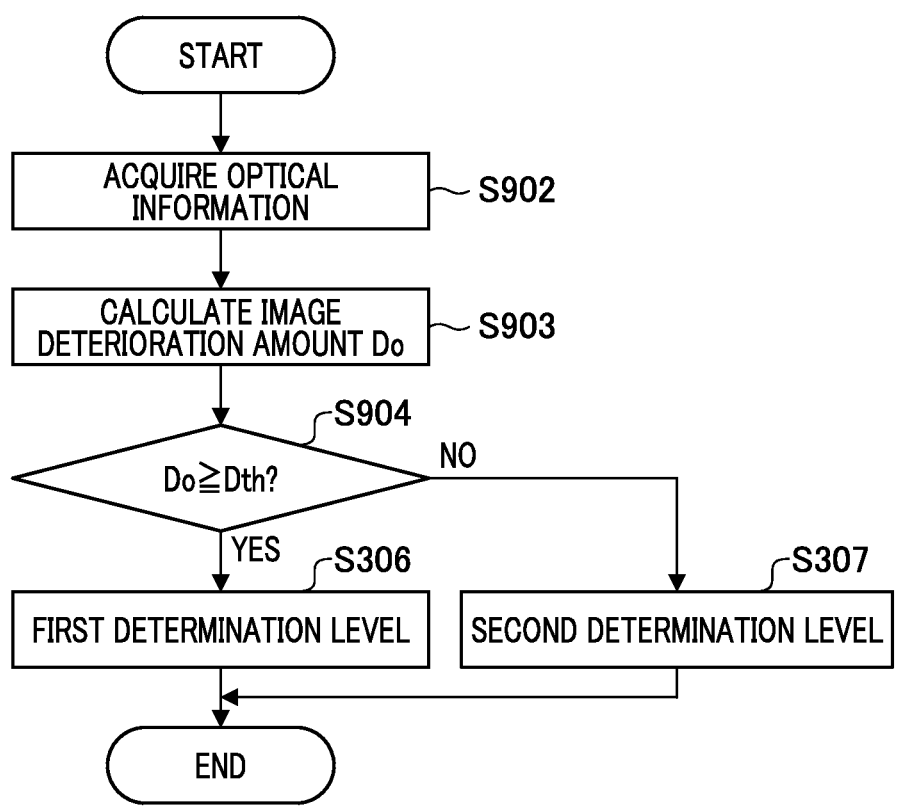
FIG. 10 is a flowchart showing determination level setting in a fourth embodiment in detail.

FIG. 10 is a flowchart showing the determination level setting in the fourth embodiment in detail.

In S902, the image evaluation device 15 acquires optical information of the imaging device 11 that is the device to be measured. Here, the optical information is information related to resolution of the imaging device 11, and for example, includes information such as a pixel pitch of an imaging element, an f value of a lens, a focal distance or aberration of the lens, or the like.

In S903, the image evaluation device 15 calculates an image deterioration amount Do occurred in an image captured by the imaging device 11 based on the parameter of the optical system obtained from the optical information. The image evaluation device 15 may calculate, for example, the image deterioration amount Do to be easy to blur as the allowable confusion circle diameter is reduced based on the allowable confusion circle diameter obtained from the pixel pitch. Alternatively, the image evaluation device 15 may calculate, for example, a subject depth from the focal distance and the f value of the imaging device 11, and may calculate the image deterioration amount Do to be easy to blur as the subject depth is shallow.

In S904, the image evaluation device 15 determines whether the image deterioration amount Do is the threshold Dth or more (Do≥Dth). The threshold Dth corresponds to the second determination level where the shake amount is set to be smaller than the first determination level among the plurality of determination levels of the image stabilization effect. The threshold Dth in S904 may be the same value as the threshold Dth of the first embodiment (S305) or the threshold Dth of the third embodiment (S805), or may be different values.

The processing shifts to S306 if the image deterioration amount Do is the threshold Dth or more in S904. In S306, the image evaluation device 15 sets the determination level (specified shake amount) of the image stabilization effect to the first determination level, and then, terminates the processing of FIG. 10.

Meanwhile, the processing shifts to S307 if the image deterioration amount Do is less than the threshold Dth in S805. In S307, the image evaluation device 15 sets the determination level (specified shake amount) of the image stabilization effect to the second determination level smaller than the first determination level, and then, terminates the processing of FIG. 10.

In the fourth embodiment, the determination level of the image stabilization effect is selected on the basis of the image deterioration amount calculated from the optical information of the imaging device 11 (S300). For example, if the image deterioration amount Do is the threshold Dth or more, the determination level of the image stabilization effect is set to the first determination level (S904, S306). In this case, the evaluation value is calculated using the first determination level in the calculation of the evaluation value of the image stabilization effect (S500). Meanwhile, if the image deterioration amount Do is less than the threshold Dth, the determination level of the image stabilization effect is set to the second determination level smaller than the first determination level (S904, S307). In this case, the evaluation value is calculated using the second determination level in the calculation of the evaluation value of the image stabilization effect (S500).

That is, in the fourth embodiment, if the image deterioration amount Do in the optical system is the threshold or more and the error of the blur amount caused by something other than the hand-shake is relatively large, the evaluation value is calculated using the first determination level having a large shake amount. Accordingly, it is possible to suppress a decrease in accuracy of the evaluation value due to the error of the blur amount caused by something other than the hand-shake. In addition, if the image deterioration amount Do in the optical system is less than the threshold and the error of the blur amount caused by something other than the hand-shake is relatively small, the evaluation value can be calculated using the second determination level smaller than the first determination level. Accordingly, it is possible to more accurately measure the image stabilization effect of the imaging device 11 if the error of the blur amount caused by something other than the hand-shake is small.

Hereinabove, while the preferable embodiments of the present invention have been described, the present invention is not limited to these embodiments and various modifications and changes may be made without departing from the spirit of the present invention.

For example, the present invention does not prevent the application of the first determination level as the determination level of the image stabilization effect even when the blur offset amount is less than the threshold Dth.

In addition, the processing (FIG. 7) of the evaluation value calculation of the second embodiment is not limited to the determination level setting (FIG. 4) of the first embodiment, and may be applied in combination with the determination level setting of the third embodiment (FIG. 9) or the determination level setting of the fourth embodiment (FIG. 10).

In addition, while the imaging in the standstill state and the imaging in the vibration state are performed while changing the shake amount assumed by setting the shutter speed value in the embodiment, a separate method may be provided. For example, the exposure condition may be changed by changing the brightness of the chart 14 that is the subject, and the assumed shake amount may be changed. If the brightness of the chart 14 is changed, the present invention can also be applied to a camera in which a shutter speed value cannot be set from the outside. Further, if the brightness of the chart 14 is changed, the variation amount De of the blur offset amount is the relationship of the variation amount of the image deterioration amount with respect to the change in brightness.

The present invention can also be realized by processing of supplying a program configured to realize at least one function of the embodiment to a system or a device via a network or a storage medium, reading and executing the program using one or more processors in a computer of the system or the device. In addition, the present invention can also be realized by a circuit configured to realize one or more functions (for example, ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-170033, filed Oct. 18, 2021 which is hereby incorporated by reference wherein in its entirety.

What is claimed is:

1. An evaluation method of an image stabilization effect of an imaging device, the evaluation method comprising:
   calculating an evaluation value of the image stabilization effect on the basis of shutter speed values in case of which each of a reference shake amount theoretically calculated on the basis of a shake waveform applied to the imaging device and a measured shake amount calculated using an image captured in a state in which the imaging device is vibrated becomes a specified shake amount; and
   setting the specified shake amount,
   wherein the setting comprises:
   calculating an image deterioration amount of the imaging device caused by something other than a shake from the outside; and
   selecting a determination level that defines the specified shake amount from a plurality of determination levels having different shake amounts on the basis of the image deterioration amount.

2. The evaluation method according to claim 1, wherein calculation of the evaluation value comprises:
   calculating a reference shake amount theoretically calculated on the basis of the shake waveform applied to the imaging device and a measured shake amount calculated using the image captured in a state in which the imaging device is vibrated using a plurality of shutter speed values;

calculating a reference shutter speed value when the reference shake amount is a specified shake amount and a measured shutter speed value when the measured shake amount is the specified shake amount; and calculating an evaluation value of the image stabilization effect using the reference shutter speed value and the measured shutter speed value.

3. The evaluation method according to claim 1, wherein the image deterioration amount is a blur offset amount calculated using the image captured in a state in which the imaging device is standing still.

4. The evaluation method according to claim 1, wherein the image deterioration amount is calculated from a parameter of an optical system of the imaging device.

5. The evaluation method according to claim 1, wherein the plurality of determination levels comprise a first determination level, and a second determination level having a shake amount smaller than that of the first determination level, and in the selecting, the second determination level is selected as the determination level that defines the specified shake amount if the image deterioration amount is less than the shake amount of the second determination level.

6. The evaluation method according to claim 5, wherein, in calculation of the evaluation value, a first evaluation value of the image stabilization effect is calculated using the shutter speed value calculated based on the first determination level, and a second evaluation value of the image stabilization effect is further calculated using the shutter speed value calculated based on the second determination level if the second determination level is selected as the determination level that defines the specified shake amount.

7. The evaluation method according to claim 1, wherein the plurality of determination levels comprise a first determination level, and a second determination level having a shake amount smaller than that of the first determination level, and in the selecting, the variation amount of the image deterioration amount with respect to a change in exposure time or brightness is compared with the second determination level, and the second determination level is selected as the determination level that defines the specified shake amount if the variation amount of the image deterioration amount is less than the shake amount of the second determination level.

8. The evaluation method according to claim 7, wherein, in calculation of the evaluation value, a first evaluation value of the image stabilization effect is calculated using the shutter speed value calculated based on the first determination level, and a second evaluation value of the image stabilization effect is further calculated using the shutter speed value calculated based on the second determination level if the second determination level is selected as the determination level that defines the specified shake amount.

9. The evaluation method according to claim 1, wherein the setting is performed before calculation of the evaluation value.

10. An evaluation device of an image stabilization effect of an imaging device, the evaluation device comprising:

at least one processor and at least one memory functioning as:

an evaluation unit configured to calculate an evaluation value of the image stabilization effect on the basis of shutter speed values in case of which each of a reference shake amount theoretically calculated on the basis of a shake waveform added to the imaging device and a measured shake amount calculated using an image captured in a state in which the imaging device is vibrated becomes a specified shake amount; and a setting unit configured to set the specified shake amount, wherein the setting unit has:

a first calculation unit configured to calculate an image deterioration amount of the imaging device caused by something other than a shake from the outside; and a selection unit configured to select a determination level that defines the specified shake amount on the basis of the image deterioration amount from a plurality of determination levels having different shake amounts.

11. A non-transitory storage medium on which is stored a computer program for making a computer of an evaluation device, the computer executing:

calculating an evaluation value of the image stabilization effect on the basis of shutter speed values in case of which each of a reference shake amount theoretically calculated on the basis of a shake waveform applied to the imaging device and a measured shake amount calculated using an image captured in a state in which the imaging device is vibrated becomes a specified shake amount; and setting the specified shake amount, wherein the setting comprises:

calculating an image deterioration amount of the imaging device caused by something other than a shake from the outside; and selecting a determination level that defines the specified shake amount from a plurality of determination levels having different shake amounts on the basis of the image deterioration amount.

* * * * *